US008729852B2

(12) United States Patent
Tsai et al.

(10) Patent No.: US 8,729,852 B2
(45) Date of Patent: May 20, 2014

(54) METHOD FOR IDENTIFICATION OF A LIGHT INDUCTIVE CHARGER

(75) Inventors: Ming-Chiu Tsai, New Taipei (TW); Chi-Che Chan, New Taipei (TW)

(73) Assignee: Fu Da Tong Technology Co., Ltd., Zhonghe Dist., New Taipei (TW)

( * ) Notice: Subject to any disclaimer, the term of this patent is extended or adjusted under 35 U.S.C. 154(b) by 344 days.

(21) Appl. No.: 13/116,654

(22) Filed: May 26, 2011

(65) Prior Publication Data

US 2011/0298419 A1    Dec. 8, 2011

(30) Foreign Application Priority Data

Jun. 3, 2010    (CN) .......................... 2010 1 0190732

(51) Int. Cl.
*H02J 7/00*        (2006.01)
*H01F 38/14*        (2006.01)

(52) U.S. Cl.
USPC .......................................... 320/108; 307/104

(58) Field of Classification Search
USPC .......................................... 320/108; 307/104
See application file for complete search history.

(56) References Cited

U.S. PATENT DOCUMENTS

| 5,438,607 A * | 8/1995 | Przygoda et al. ............... 379/38 |
| 5,497,507 A * | 3/1996 | Komaki ..................... 455/552.1 |
| 6,184,651 B1 * | 2/2001 | Fernandez et al. ............ 320/108 |
| 6,212,403 B1 * | 4/2001 | Ushiroda ...................... 455/557 |
| 7,232,460 B2 * | 6/2007 | Van Erlach et al. .......... 623/1.15 |
| 7,469,129 B2 * | 12/2008 | Blaker et al. .................. 455/107 |
| 8,056,269 B2 * | 11/2011 | Beers et al. .................... 36/137 |
| 2003/0032892 A1 * | 2/2003 | Erlach et al. .................. 600/547 |
| 2009/0272013 A1 * | 11/2009 | Beers et al. ...................... 36/137 |

\* cited by examiner

*Primary Examiner* — M'Baye Diao
(74) *Attorney, Agent, or Firm* — Winston Hsu; Scott Margo

(57) ABSTRACT

The present invention relates to a method for identification of a light inductive charger, in which a power base includes a light receiving hole to expose a light receiver, and a light emitting component is established in a light emitter of a wireless charging receiver to emit lights towards the light receiving hole. The power base transmits electromagnetic wave energy to the receiving terminal for a short period of time when finding it covered by an object, in a dark place or covered by the wireless charging receiver after having received lights from the light receiver and transmitted the signals to the microprocessor via a voltage detection circuit. The charging module of the wireless charging receiver, if not fully charged, feeds back light signals for the same time period to indicate that charging is required. Then charging energy of electromagnetic waves will be emitted to start charging.

18 Claims, 4 Drawing Sheets

METHOD FOR IDENTIFICATION OF A LIGHT INDUCTIVE CHARGER

This application claims the priority benefit of The People's Republic of China patent application number 201010190732.3, filed on Jun. 3, 2010.

BACKGROUND OF THE INVENTION

1. Field of the Invention

The present inventions relates to a method for identification of a light inductive charger, particularly to the method in which a light receiver and a light emitter are installed on the emitting and receiving terminals of the wireless charging receiver as an identifying device, and the microprocessor of the emitting terminal determines the corresponding receiving terminal according to the light receiving state of the light receiver, so that wireless power energy is emitted to the receiving terminal for charging purpose.

2. Description of the Related Art

Nowadays, the age of electronics technology and worldwide access of Internet make various kinds of digital products, for example, digital cameras, mobile phones, multimedia video and audio players (MP3, MP4 or MP5 players, etc.) and other kinds of portable AV electronic devices, flood into our life, and these portable electronic devices tend to be light, thin, short and miniature in design.

Yet, the first thing to be addressed in achieving portability of portable electronic devices is power supply for these products, and the most common solution is to build rechargeable batteries into these devices, so that the batteries can be recharged when the devices run out of electricity. However, as portable electronic devices of different firms have different specifications and have specific chargers compatible with the devices, when a new portable electronic device is bought, an additional charger is required to be compatible with it, thus making the acquisition cost for these devices increase significantly. Besides, if there are many chargers for portable electronic devices, it will cause considerable convenience in management and require some room for these chargers, thus making it not convenient to keep and carry them for use.

In light of this, some firms develop wireless charging devices to transmit power by utilizing electromagnetic induction, which provide excellent convenience through contactless power supply on the principle of electromagnetic induction, making such devices in the limelight immediately after having been launched into the marketplace. Currently, wireless charging devices available in the marketplace mainly include two types: those with identifying function and those without identifying function. With regard to system design, wireless charging devices without identifying function can emit energy of wireless electromagnetic waves continuously from the emitting terminal. No matter what object the receiving terminal is, their emitting antennas will emit power energy toward the object continuously. If the receiving terminal is not a designed charger at this moment, the power energy will heat up the metal objects and may cause dangers. For wireless charging devices with identifying function, the receiving terminal of the charges has a microprocessor capable of feeding back signals to the emitting terminal for identification purpose. Only after a charger designed for the system is identified, the receiving terminal will begin to charge. Thus, the system design with identifying function provides better safety. So it is necessary to apply the identifying function into wireless charging devices for safety considerations. However, such charging devices need to transmit signals through wireless communication, thus requiring microprocessors or detection chips to be installed at the receiving terminal. This will result in complicated circuit layout and high production costs of these charging devices. Moreover, high-cost design is not applicable to electronic products with low unit prices, and this will limit the scope of its use and needs to be solved by those engaged in this field through optimized design.

SUMMARY OF THE INVENTION

In view of aforesaid problems and disadvantages of wireless charging devices, the inventor has collected related information, conducted assessments and taken considerations in many aspects, and based on his experience of many years in this field, has finally invented a method for identification of a light inductive charger following continuous trials and corrections.

A primary object of the present invention is to install a light receiver and a light emitter on the emitting terminal of the power base and the receiving terminal of the wireless charging receiver as a simple identifying device, so that the microprocessor of the emitting terminal can determine the corresponding receiving terminal according to the light receiving state of the light receiver, and the power base can emit energy of wireless electromagnetic waves to the receiving terminal for charging purpose. Besides, as the receiving terminal only requires simple circuit configuration for receiving power energy and it is not necessary to install a microprocessor on the wireless charging receiver, this can simplify overall circuit layout, significantly reduce use of electronic components, and make low-cost design be widely adopted in electronic products of low unit prices (e.g. toys, home phones or remote controllers), thus achieving wireless charging effect.

A secondary object of the present invention is to enable the microprocessor of the emitting terminal of the power base to automatically analyze characteristics of coil oscillation of the power supply resonance circuit by using a voltage measurement circuit, optimize power output through frequency conversion control of output energy, reduce loss of energy in the process of transmission, and convert additional power, so as to achieve the effect of frequency conversion chargers and power saving. At the same time, a display module is fixed to display the corresponding system time, charging time, charging status and other parameters in a multi-function mode, thus making it convenient for users to be fully aware of the current status.

A further object of the present invention is to enable the emitting terminal of the power base to enter into sleep mode when no wireless charging receiver is placed on the power base, so as to reduce power consumption, save electricity, reduce operation costs and improve operation safety.

DETAILED DESCRIPTION OF THE PREFERRED EMBODIMENT

To achieve the aforesaid objects and functions as well as the techniques adopted in the present invention and its fabrication, examples of the preferred embodiment of the present invention are given below to illustrate features and functions of the present invention in detail by referring to the accompanying drawings.

Figure 1:
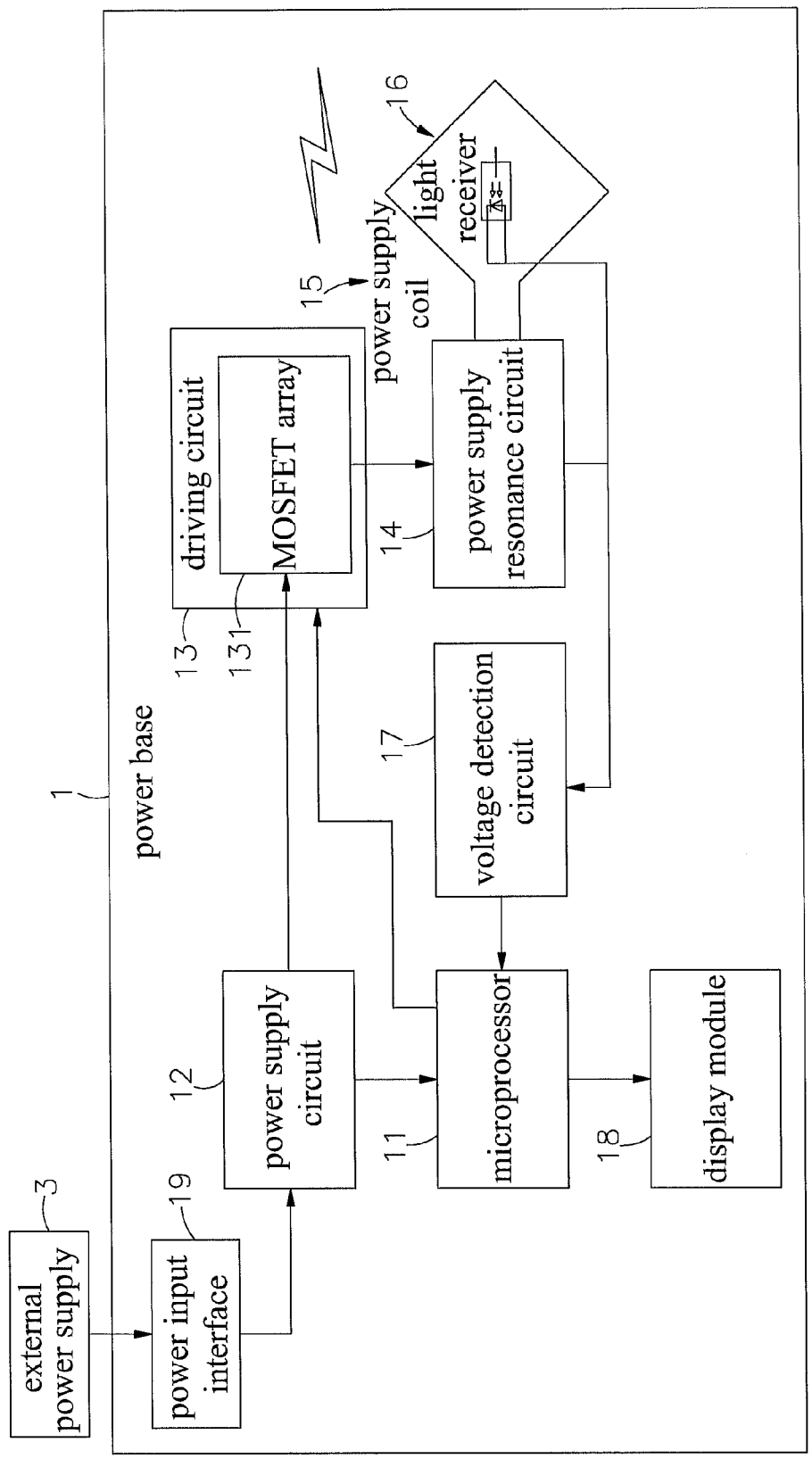
FIG. 1 is a block diagram of a power base according to the present invention.
Figure 2:
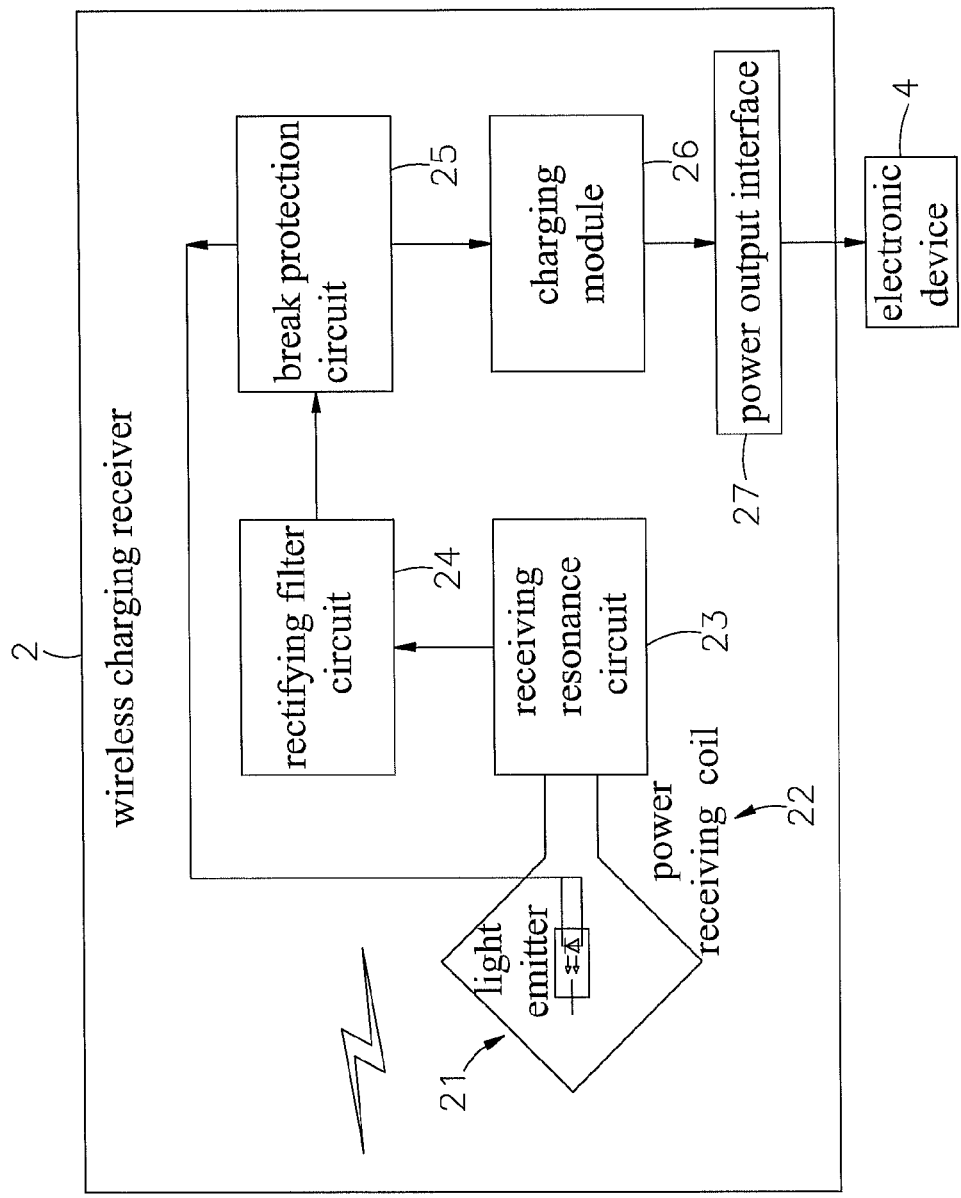
FIG. 2 is a block diagram of a wireless charging receiver according to the present invention.
Figure 3:
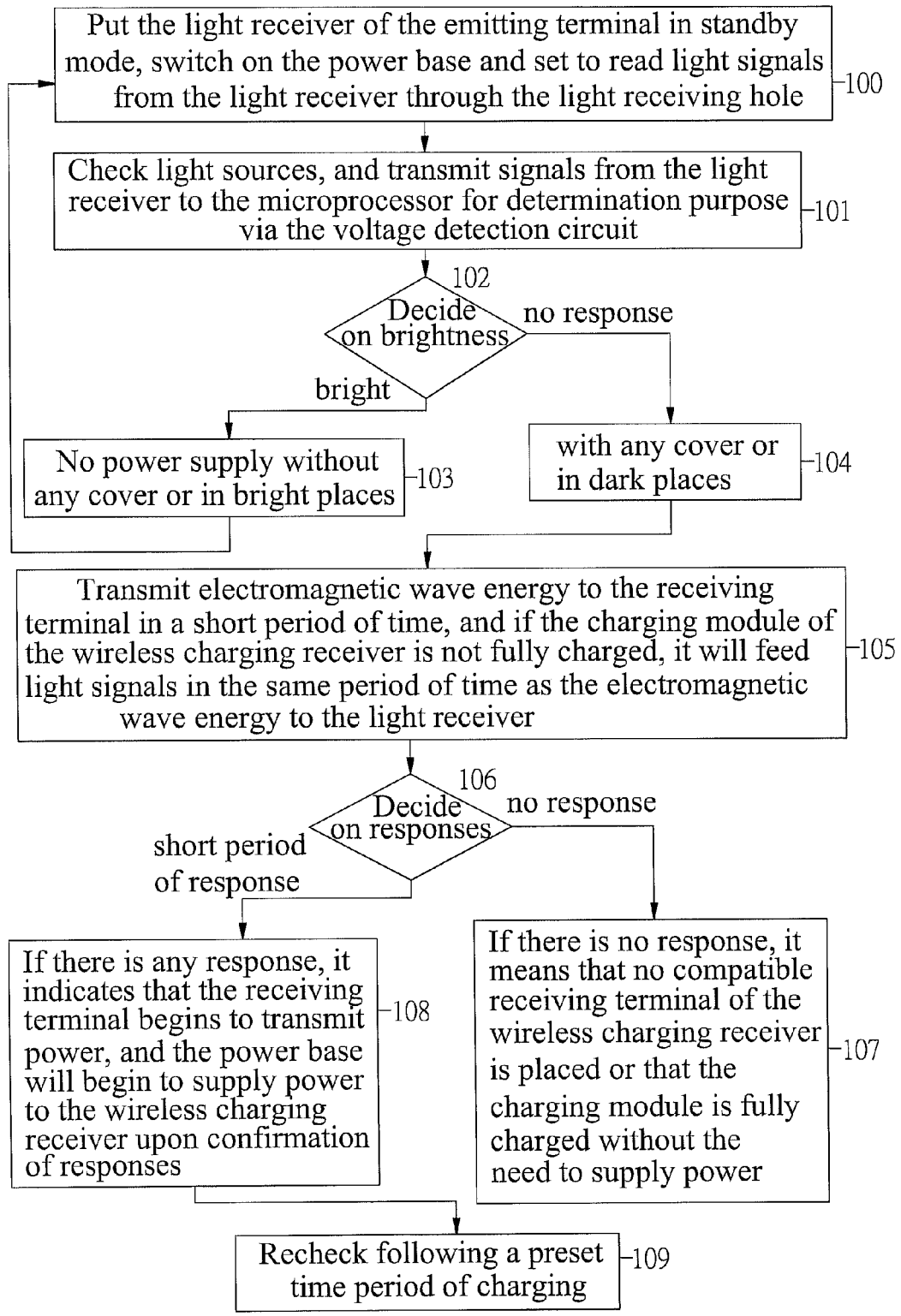
FIG. 3 is a flow chart of steps according to the present invention.
Figure 4:
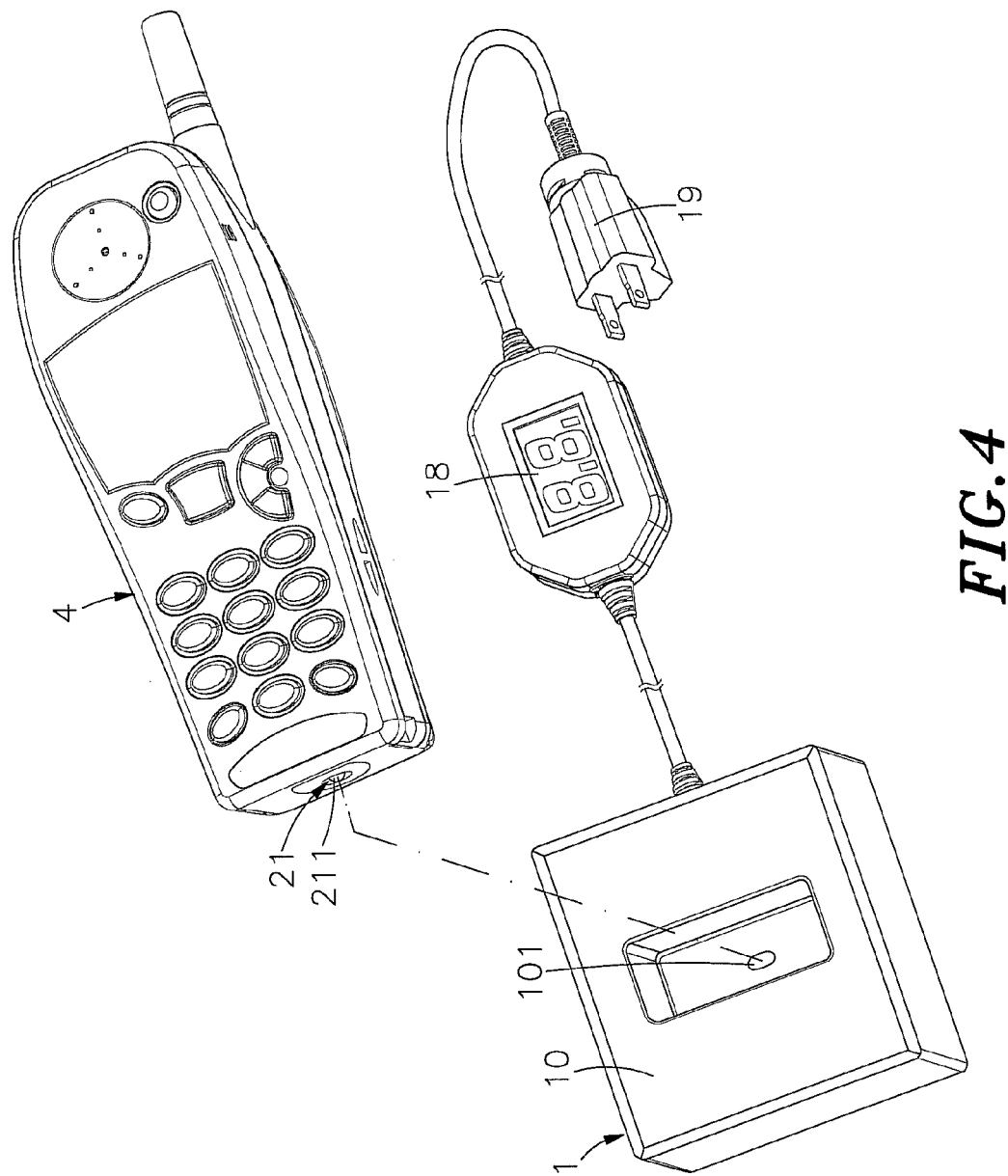
FIG. 4 is a schematic drawing of the structure according to one preferred embodiment of the present invention.

Refer to FIGS. 1, 2 and 3, which are respectively a block diagram of a power base, a block diagram of a wireless charging receiver and a flow chart of steps according to the present invention. As shown clearly in these figures, the present invention includes a power base 1 and a wireless charging receiver 2, wherein:

The power base 1 contains a body 10 in which a circuit board with proposed circuit layout and electronic components is fixed, and the circuit board includes a microprocessor 11 electrically connected to a power supply circuit 12 that connects to an external power supply 3 and supplies low-voltage electricity to the microprocessor 11. Besides, the microprocessor 11 is electrically connected with a driving circuit 13 to which high-voltage electricity is supplied by the power supply circuit 12, wherein the driving circuit 13 contains a MOSFET array 131 that is electrically connected to a power supply resonance circuit 14. The power supply resonance circuit 14 is electrically connected to a power supply coil 15 that is capable of emitting energy. Furthermore, the power supply resonance circuit 14 connects in parallel with a light receiver 16 and a voltage detection circuit 17 which can detect changes in voltages of the power supply resonance circuit 14 and light receiver 16, convert these changes into corresponding voltage signals and transmit the signals to the microprocessor 11. Besides, the microprocessor 11 is electrically linked with a display module 18 capable of indicating the state of use.

The wireless charging receiver 2 includes a light emitter 21 capable of emitting light signals and a power receiving coil 22 that can receive power energy through electromagnetic induction, wherein the power receiving coil 22 is electrically connected to a receiving resonance circuit 23 which further connects to a rectifying filter circuit 24 able to receive transmitted A/C power input and convert it into D/C power for output. And the rectifying filter circuit 24 connects electrically to a break protection circuit 25 that can receive the signals it transmits, convert these signals into light signals and feed back the light signals to the light emitter 21, while the break protection circuit 25 is electrically connected with a charging module 26 capable of receiving A/C power from the rectifying filter circuit 24 for charging purpose and of supplying D/C power to an electronic device 4, so that the break protection circuit 25 can disconnect the rectifying filter circuit 24 and cut off the power supply without feeding back light signals to the light emitter 21 when determining whether the charging module 26 is fully charged.

Besides, the body 10 of the power base 1 includes a light receiving hole 101 to make the light receiver 16 seen from the outside, and the light emitter 21 of the wireless charging receiver 2 has a light emitting component 211 that can point directly to the light receiving hole 101. The light emitting component 211 may be a LED, a light bulb or a fluorescent tube or any other type of light emitting device, and can project the light emitted from it onto the light emitter 21 to which the body 10 corresponds through the light receiving hole 101. In addition, the power supply circuit 12 and charging module 26 of the power base 1 and wireless charging receiver 2 are electrically connected with a power input interface 19 and a power output interface 27 respectively, wherein the power input interface 19 may be a USB, A/C transformer or commercial power connector, while the power output interface 27 may be a USB or D/C plug or socket that the electronic device has. It is hereby stated that all modifications and equivalent structural changes made without departing from the spirit of the descriptions and drawings of the present invention shall be included in the appended patent claims of the present invention.

To apply the method for identification of identification of a light inductive charger, the steps shall be implemented as follows:

(100) Put the light receiver 16 of the emitting terminal in standby mode, switch on the power base 1 and set to read light signals from the light receiver 16;

(101) Check light sources, and transmit signals from the light receiver 16 to the microprocessor 11 for determination purpose via the voltage detection circuit 17;

(102) Determine brightness, if it is bright, proceed to step (103); otherwise, proceed to step (104);

(103) No power supply is needed without any cover or in bright places, however if power supply is needed electromagnetic wave energy is emitted. Therefore, the light receiver will receive bright light rays and determine that no wireless charging receiver is placed on the power base, or there is no cover or the light receiver is in a bright place, so no power supply is needed, then proceed to step (100) again;

(104) If there is any cover or the light receiver is in a dark place, when it suddenly darkens or the light receiver is always in a dark place, it is likely that the charging module 26 is fully charged and the light emitting component 211 will not respond;

(105) Transmit electromagnetic wave energy to the receiving terminal in a short period of time, and the charging module 26 of the wireless charging receiver 2 will feed light signals in the same period of time as the electromagnetic wave energy to the light receiver 16 to respond to the power base 1; this state shall be understood as requiring charging;

(106) Determine responses and the state of responses includes charging required and charging not required; if there is no response, proceed to step (107); if there is a short period of response, proceed to step (108);

(107) If there is no response, it means that no compatible receiving terminal of the wireless charging receiver 2 is placed on the light inductive charger or that the charging module 26 is fully charged without the need to supply power;

(108) If there is any response, it indicates that the receiving terminal begins to transmit power, and the power base 1 will begin to supply power to the wireless charging receiver 2 upon confirmation of responses;

(109) Recheck charging at an interval of a predetermined time period, and the light emitting component 211 is switched on in the charging process; if the wireless charging receiver 2 is removed suddenly in the process of charging, the light receiver 16 will receive external light rays and may wrongly determine that charging is still in process; so it is necessary to interrupt charging and re-check at an interval of a preset time period.

According to the implementation steps as indicated above, it can be seen clearly that the light inductive charger in the present invention includes the power base 1 and the wireless charging receiver 2, wherein the power base 1 can be connected with an external power supply 3 via the power output interface 27 (e.g. USB, A/C transformer or commercial electricity connector, etc), so that the power supply circuit 12 will convert the A/C power transmitted by the external power supply 3 into D/C power and supply stable low-voltage power to the microprocessor 11 and driving circuit 13. The software programs installed in the microprocessor 11 relies on the voltage detection circuit 17 to detect, analyze and determine power output of the power supply resonance circuit 14 and the state of receiving light of the light receiver 16, and further determine if it is necessary to deliver power to the receiving terminal.

After switching on the power base 1, set to read light signals from the light receiver 16 for determination, so as to make the light receiver 16 convert the light signals received from the light receiving hole 101 into corresponding voltage signals, which will be detected by the voltage detection circuit 17 and further transmitted to the microprocessor 11 to determine brightness of the light rays. The method for determining brightness is to continuously examine changes in brightness of light rays from a previous time point (e.g. in the last one or two seconds, etc.) to this moment by using the programs installed in the microprocessor 11. Slow darkening of light may be caused by environmental factors, for example, the process in which daylights are replaced by nights, while sudden darkening of light (the light receiving hole 101 is covered) may mean that the corresponding wireless charging receiver 2 is placed or covered by other objects. If lights are determined as bright and the power supply resonance circuit 14 does not emit energy of electromagnetic waves via the power supply coil 15, the light receiver 16 will receive bright lights and determine that the wireless charging receiver 2 is not placed on the power base 1, or the power base 1 is not covered by other objects or is in a bright place, thus resulting in no power supply; if lights are determined as dark, it may be determined that the wireless charging receiver 2 is placed on the power base 1, or that the power base 1 is covered by other objects or in a dark place. If the lights darken suddenly or the power base 1 is always in a dark place, it is likely that the charging module 26 is fully charged, and the light emitting component 211 of the light emitter 21 will not respond. In such case, the power supply resonance circuit 14 and the power supply coil 15 will begin to oscillate and emit energy of wireless electromagnetic waves due to resonance matching, and emit energy of wireless charging electromagnetic waves for a short period of time (e.g. 0.1 seconds, 0.2 seconds, etc) to the receiving terminal of the wireless charging receiver 2. If the break protection circuit 25 determines that the charging module 26 is not fully charged, it will receive signals from the rectifying filter circuit 24 and feed light signals in the same period of time as in emitting energy of electromagnetic waves to the light emitter 21, so as to make the light emitting component 211 emit lights to the light receiver 16 in response to the power base 1. And this state shall be determined as charging required.

Besides, the state of responses includes charging required and charging not required. If the light is dark with no response, it is likely that no compatible wireless charging receiver 2 is placed or the charging module 26 is fully charged without the need to emit power energy; if the light is bright for a short period of time, it can be determined that there is a response, and following confirmation of the response from the receiving terminal, emission of power energy will be started to the wireless charging receiver 2, and during the charging process, the light emitting component 211 will be switched on continuously. However, if the wireless charging receiver 2 is suddenly removed in the process of charging, the light receiver 16 of the power base 1 may wrongly consider charging still in process as it receives lights from the outside. To prevent this problem from occurring, the charging module 26 needs to interrupt and re-examine charging at an interval of a preset time period according to the above-mentioned light check steps following charging. If the break protection circuit 25 determines that the charging module 26 is fully charged, it will disconnect the rectifying filter circuit 24 from the charging module 26, and will not feed back light signals to the light emitter 21 either, making the light emitting component 211 not respond to the power base 1 and stop charging based on the judgment that charging is not required. The power base 1 makes use of structural design of the light receiving hole 101 and includes the light receiver 16 and light emitter 21 as an identifying device on the power base 1 and wireless charging receiver 2, enabling the receiving terminal of the wireless charging receiver 2 to receive supply of power energy with simple circuit configuration without the need to install a microprocessor or detection chip etc. on the receiving terminal of the wireless charging receiver 2. This can simplify overall circuit layout and help reduce use of electronic components significantly, and such low-cost design can be widely adopted in electronic products of low unit prices (such as toys, home phones or remote controllers, etc) to achieve wireless charging effect, or the charging module 26 is directly utilized to charge the electronic device 4.

In the process of delivering power from the power base 1, the microprocessor 11 will first transmit frequency signals to the driving circuit 13, and pushes the switch of the MOSFET array 131 to switch on the power supply resonance circuit 14. Then, the power supply resonance circuit 14 and power supply coil 15 will oscillate due to resonant matching to emit charging energy of wireless electromagnetic waves to the receiving terminal of the wireless charging receiver 2, and the power receiving coil 22 receives power energy by electromagnetic induction and matches the receiving resonance circuit 23 to maximize energy transmission. The rectifying filter circuit 24 converts the A/C power transmitted from the receiving resonance circuit 23 into D/C power first, and output the D/C power to the break protection circuit 25. If the break protection circuit 25 determines that the charging module 26 is not fully charged, it will supply high-voltage power to charge the charging module 26, or directly delivers D/C power to charge the electronic device 4 wirelessly by using the charging module 26. Besides, as the microprocessor 11 on the emitting terminal of the power base 1 can automatically analyze characteristics of coil oscillation of the power supply resonance circuit 14 and optimizes power output through frequency conversion control of output energy via the voltage detection circuit 17, this helps reduce unnecessary loss in the process of energy transmission and conversion of additional power, thus making it function as a frequency conversion type charger and achieving the effect of energy saving. At the same time, the display module 18 may be a status indicator lamp, a seven-segment display or a LCD consisting of one or more LEDs capable of indicating the system time, charging time, charging status or other functions, it is convenient for users to be fully aware of the present operational status.

Therefore, the present invention mainly focuses on installing the light receiver 16 and light emitter 21 onto the emitting terminal of the power base 1 and receiving terminal of the wireless charging receiver 2 as a simple identifying device, and uses the microprocessor 11 on the emitting terminal to determine if the receiving terminal of the wireless charging receiver 2 is identified according to the light receiving status of the light receiver 16. If the wireless charging receiver 2 is identified, the power base 1 will transmit charging energy of wireless electromagnetic waves to the receiving terminal for charging purpose, in which the receiving terminal can fulfill power supply with simple circuit configuration without the need to install a microprocessor. This helps simplify overall circuit layout, reduce use of electronic components significantly and eventually reduce manufacture costs. Besides, when the receiving terminal of the wireless charging receiver 2 is not placed on the power base 1, the emitting terminal of the power base 1 will enter into the sleep mode to reduce power consumption, save energy, reduce costs and improve operating safety. However, the aforesaid descriptions are given only to illustrate one preferred embodiment of the present invention, and shall not be construed as limiting the patent claims of the present invention. It is hereby stated that all modifications and equivalent structural changes made without departing from the spirit and scope of the present invention shall be included in the appended patent claims of the present invention.

In summary, the method for identification of a light inductive charger as described above can achieve its functions and objects if applied. Therefore, the present invention is really an excellent one with practical applicability and can satisfy the conditions for patentability of a utility model. While the application of patent is filed pursuant to applicable laws, your early approval will be highly appreciated so as to guarantee benefits and rights of the inventor who has worked hard at this invention.

What is claimed is:

1. A method for identification of a light inductive charger, wherein the light inductive charger comprises a power base and a wireless charging receiver, the method comprising:
    emitting light from a light emitting component of a light emitter of the wireless charging receiver towards a light receiving hole of the power base;
    receiving the emitted light at a light receiver of the power base through the light receiving hole of the power base;
    determining, by a microprocessor of the power base, brightness of the received emitted light at periodic time intervals; and
    if a periodic determination results in a finding that either (a) no light is being emitted or (b) the light has been bright for a long period of time, then no power is emitted by the power base;
    if the periodic determination results in the light being indicated bright for a short period of time, emitting power by the power base.

2. The method for identification of the light inductive charger according to claim 1, wherein the power base includes the microprocessor electrically connected with a power supply circuit which can be connected to an external power supply;
    wherein the microprocessor is electrically linked with a driving circuit that contains a MOSFET array which is further electrically connected with a power supply resonance circuit;
    wherein the power supply resonance circuit is electrically connected to a power supply coil capable of transmitting energy, and is connected in parallel with the light receiver and a voltage detection circuit that can detect changes in voltages of the power supply resonance circuit and the light emitter,
    wherein the method further comprises:
    converting the voltage changes into electric signals; and
    transmitting the converted electric signals to the microprocessor to decide on power transmission.

3. The method for identification of the light inductive charger according to claim 2, wherein the microprocessor of the power base includes a software program capable of examining and analyzing power output from the power supply resonance circuit as well as a light receiving status of the light receiver by using the voltage detection circuit;
    deciding if power supply to the wireless charging receiver is needed or not.

4. The method for identification of the light inductive charger according to claim 2, wherein the microprocessor of the power base is electrically connected with a display module capable of indicating operational status, and the display module may be a status indicator lamp, a seven-segment display or an LCD consisting of one or more LEDs.

5. The method for identification of the light inductive charger according to claim 2, wherein the power supply circuit of the power base is electrically connected with a power output interface, which can connect to an external power source and may be a USB, A/C transformer or commercial electricity connector.

6. The method for identification of the light inductive charger according to claim 1, wherein the wireless charging receiver includes a power receiving coil to receive power energy through electromagnetic induction,
    wherein the power receiving coil is electrically connected to a receiving resonance circuit which further connects to a rectifying filter circuit able to receive transmitted A/C power input and convert it into D/C power for output;
    wherein the rectifying filter circuit connects electrically to a break protection circuit that can receive the signals transmitted, convert these signals into light signals and feed back the light signals to the light emitter, while the break protection circuit is electrically connected with the charging module capable of receiving D/C power from the rectifying filter circuit for charging purpose and of supplying D/C power to an electronic device;
    wherein the break protection circuit disconnects the rectifying filter circuit and cuts off the power supply without feeding back light signals to the light emitter when the charging module is fully charged.

7. The method for identification of the light inductive charger according to claim 6, wherein the charging module of the wireless charging receiver is electrically connected with a power output interface connected to a wireless charging device; and
    wherein the power output interface may be a USB, D/C plug or socket installed in the wireless charging device.

8. The method for identification of the light inductive charger according to claim 1, wherein the brightness determination further comprises using programs embedded in the microprocessor to examine changes of lights continuously through comparison between the light in at a previous time point and the current light;
    wherein the microprocessor determines gradual darkening status when daylight turns to night;
    wherein the microprocessor determines sudden darkening status when the light receiving hole on the power base is covered.

9. The method for identification of the light inductive charger according to claim 1, wherein the power base is set to read light signals from the light receiver through the light receiving hole.

10. The method for identification of the light inductive charger according to claim 1, wherein the wireless charging receiver is a portable electronic device.

11. The method for identification of the light inductive charger according to claim 10, wherein the portable electronic device is one of: a toy, a phone and a remote controller.

12. The method for identification of the light inductive charger according to claim 1, wherein the periodic determination is performed by a voltage detection circuit.

13. The method for identification of the light inductive charger according to claim 1, wherein the charging of the wireless charging receiver is performed by power emitted as electromagnetic wave energy; and wherein the power base is an electromagnetic power base.

14. The method for identification of the light inductive charger according to claim 1, wherein the wireless charging receiver was designed for use with a different power base.

15. A system for identifying a light inductive charger, comprising:
- the light inductive charger comprising a power base and a wireless charging receiver;
- the wireless charging receiver comprising a light emitter;
- wherein a light emitting component of the light emitter of the wireless charging receiver emits light towards a light receiving hole of the power base;
- wherein a light receiver of the power base receives the emitted light through the light receiving hole of the power base;
- wherein a microprocessor of the power base, determines brightness of the received emitted light at periodic time intervals; and
- if a periodic determination results in a finding that either (a) no light is being emitted or (b) the light has been bright for a long period of time, then no power is emitted by the power base;
- if the periodic determination results in the light being indicated bright for a short period of time, emitting power by the power base.

16. The system of claim 15, wherein the wireless charging receiver identifies the light inductive charger that was designed for a different wireless charging receiver; and
- wherein power energy is emitted to a receiving terminal of the wireless charging receiver.

17. The system of claim 16, wherein the wireless charging receiver is a portable electronic device.

18. The system of claim 17, wherein the portable electronic device is one of: a digital camera, mobile phone, multimedia player, an audio player, a toy and a remote controller.

\* \* \* \* \*